Jan. 6, 1942.  G. L. MACKINTOSH ET AL  2,269,278
CHANGEABLE NAME STRIP DIRECTORY
Filed Dec. 19, 1938  2 Sheets-Sheet 1
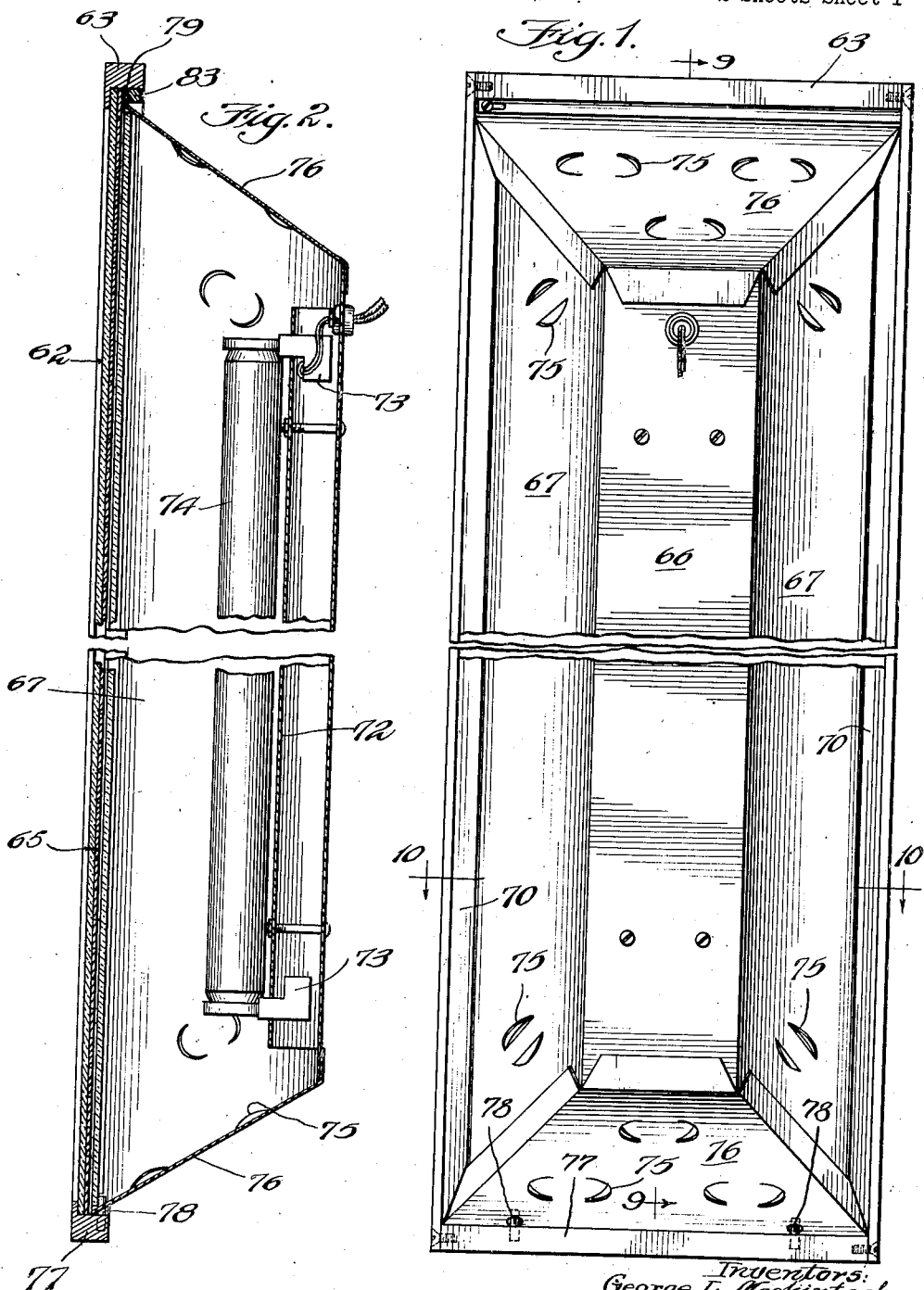
Inventors:
George L. Mackintosh,
Earl B. Barkley,
William England &
Lester H. Willson.
By: George H. Simmons Atty.

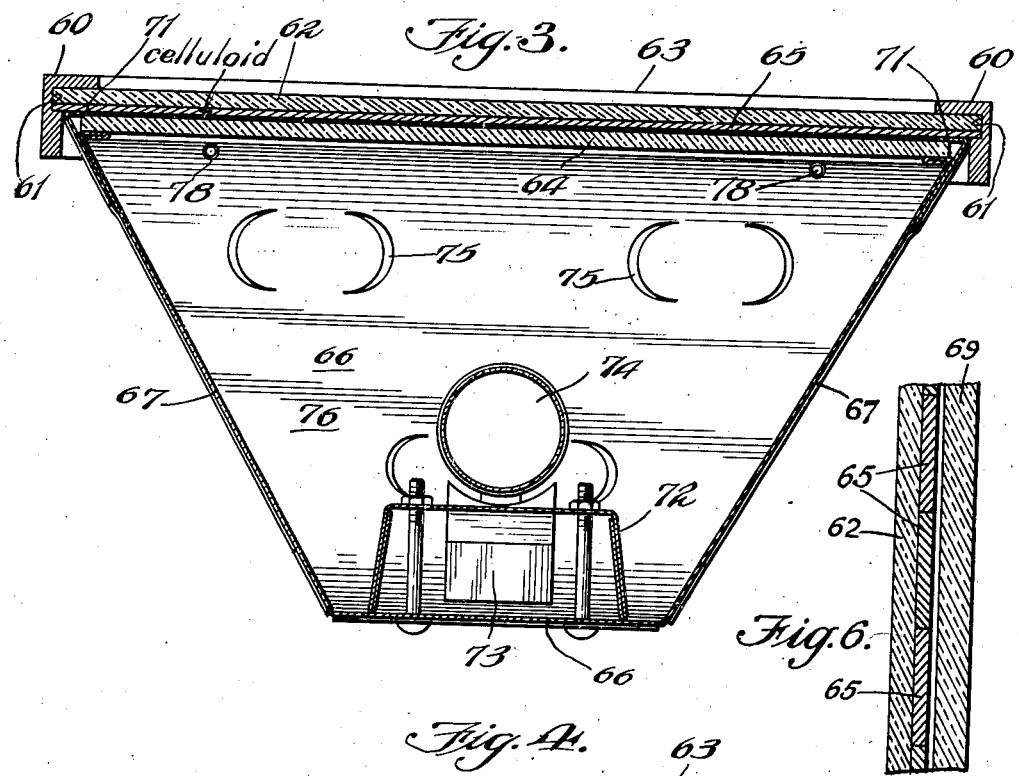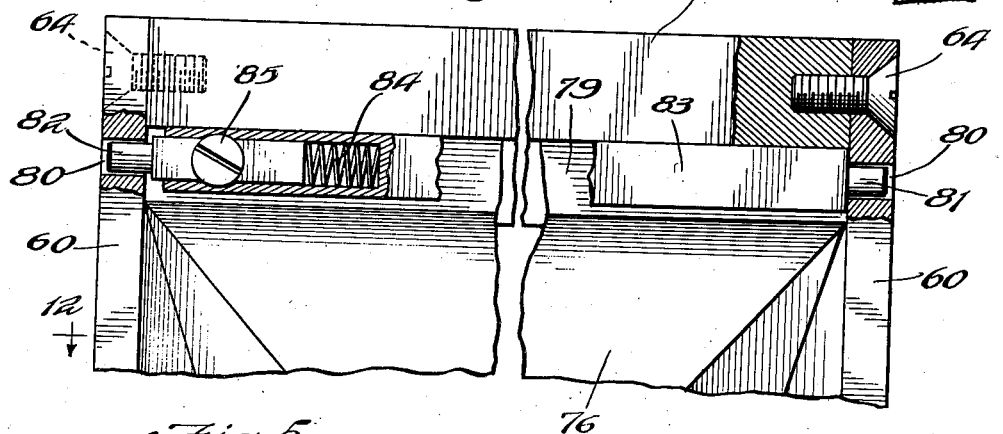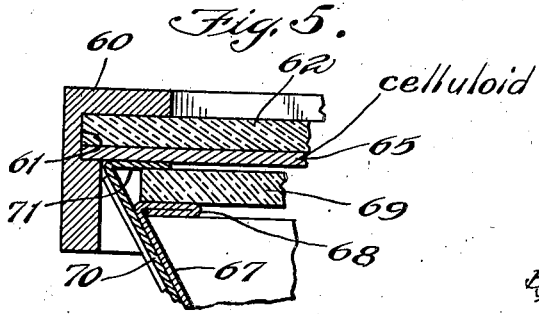

Patented Jan. 6, 1942

2,269,278

UNITED STATES PATENT OFFICE 2,269,278

CHANGEABLE NAME STRIP DIRECTORY

George L. Mackintosh, New York, N. Y., and Earl B. Barkley, William England, and Lester H. Willson, Chicago, Ill., assignors to The Tablet & Ticket Co., Chicago, Ill., a corporation of Illinois Application December 19, 1938, Serial No. 246,614

6 Claims. (Cl. 40—132)

This invention relates to changeable name strip directories, bulletin boards, and the like, and has for its principal object, the provision of new and improved structures of this type.

It is a main object of the invention to provide a directory or bulletin board capable of being styled to fit into the environment in which it is used.

Another object of the invention lies in the provision of illumination for a directory or bulletin board arranged to diffuse light evenly over the board so as to cause the characters thereon to stand out against a lighted background.

Still another object of the invention lies in the provision of a simple rugged panel for holding name strips in a directory or bulletin board.

Still another object of the invention lies in the provision of a panel which may be readily disassembled to permit changing the name strips contained in it.

It is a further object of the invention to provide a directory wherein the name strip panel and lighting means therefor are formed as a unit.

Another object of the invention lies in the provision of a self-contained lamp box which may be attached to and removed from the directory panel as a unit.

Further objects of the invention, not specifically mentioned here, will be apparent from the detailed description and claims which follow, reference being had to the accompanying drawings in which a preferred embodiment of the invention is shown by way of example and in which:

Figure 1 is a backside elevational view of a directory panel embodying the teachings of the invention;

Figure 2 is a cross-sectional view taken substantially along the line 2—2 of Figure 1 looking in the direction of the arrows;

Figure 3 is a cross-sectional view drawn to an enlarged scale and taken substantially along the line 3—3 of Figure 1, looking in the direction of the arrows;

Figure 4 is a fragmentary view of the panel, partly in section, showing particularly the method of locking the assembly together;

Figure 5 is a fragmentary cross-sectional view taken along the line 5—5 of Figure 4, drawn to an enlarged scale;

Figure 6 is a fragmentary view through the transparent and translucent panels, showing particularly the position of the strips 65 therebetween It is old in the prior art of which we are aware, to provide, in the lobby of an office building, for example, a directory upon which appears the name and room number of the tenants in the building. Such directories may take any one of a number of forms but usually consist of a generally rectangular frame in which there are mounted a plurality of removable panels in which the name and room designating strips are mounted.

Heretofore these panels have consisted of a suitable frame work in which a glass front panel is mounted. The name of the tenant and the room number are fixed upon a strip of paper or cardboard which is disposed against the glass panel and held there against by a backing board which is in turn held in the frame by suitable clamps. Usually the names appear in white letters against a black background and the panels contain either fifty or one hundred names, although smaller panels are sometimes used.

These prior art devices, while satisfactory as a means for giving information as to the name and room numbers of the tenants in a building, do not lend themselves readily to different stylings and as a result often times do not harmonize with the decorative treatment of the place in which they appear.

The present invention relates primarily to a directory of this type, although the teachings of the invention may equally well be applied to other types of directories or bulletin boards as will presently appear. In accordance with the teachings of the present invention, the directory is arranged so as to have greater flexibility of style so that it may fit harmoniously into the decorative scheme of the building in which it is used.

In the preferred embodiment, a directory built in accordance with the teachings of the invention, employs the frame work, as before, in which there are mounted a sufficient number of panels to provide name spaces for all of the tenants in the building. The panels are constructed so as to have a transparent front plate against which name strips are disposed and held by a translucent diffusing plate mounted in the back side of the frame. The name strips themselves are translucent and are arranged to diffuse light passing through them so that when light is thrown upon the panel from the rear, the characters on the name strips will stand out in silhouette against a softly lighted background.

Although the director panel of the present invention is adapted to be illuminated from the rear, it is not necessary that it be illuminated as the panel may be placed over a black or dark background and the characters on the name strip readily identified since they stand out in a dark color in contrast to a white or lightly tinted background.

In accordance with the teachings of our invention, the panel may be illuminated from the rear in a number of ways. It may be mounted across the front of a box-like structure in which there is mounted a suitable illuminating means such as a filament or a vapor tube lamp. In other instances, a lamp box may be attached to the panel so that the panel and its illuminating means form a self-contained unit. The lamp box is equipped with a suitable source of illumination and is shaped so as to reflect light from that source uniformly over the entire surface of the panel.

In the embodiment of the invention shown in the drawings, as will be best seen in Figures 3, 4 and 5, the frame of the panel consists of L-shaped side rails 60 which rails have a groove 61 formed in them. The transparent front plate 62 fits in the grooves in the side rails and is held therein by the top and bottom end rails 63 to which the side rails are secured in any preferred manner such as by screws 64. The width of the grooves 61 is greater than the thickness of the plate 62 so as to provide a groove into which the ends of the translucent strips 65 are projected to hold these strips in the frame.

A lamp box 66 is formed to fit inside of the rearwardly projecting flanges of the frame and against the strips 65.

As shown in the drawings, the lamp box 66 is formed as a frustum of a pyramid, this particular shape being shown by way of example as will presently appear. Preferably the box is composed of metal and at the base of the pyramid the metal of the side walls 67 is doubled over upon itself and fronted inwardly of the box as will be best seen in Figure 5, to form feet 68. A translucent light diffusing plate 69 is rested upon these feet and held thereon by a second piece of metal 70 that is fixed to the outside of the box wall 67 and bent over the upper face of the translucent plate, as shown in Figure 5.

Preferably only the side walls 67 of the lamp box contain feet 68 so that these feet and the retaining plate 71 form grooves extending along the sides of the lamp box. The translucent plate 69 slides into these grooves and the retaining plate 71 is crimped down over the ends of the translucent plate to hold the same in the lamp box.

Mounted within the lamp box is a suitable bracket 72 upon which are mounted the terminals 73 of a source of light 74. As shown, this source of light consists of a tubular lamp bulb which may be either a filament lamp or a vapor lamp. Suitable perforations 75 are cut in the box so as to permit air to circulate therethrough and dissipate the heat generated by the source of light.

As will be seen best in Figure 1, top and bottom sections 76 of the lamp box lap over the outside of the side wall sections 67 and are affixed thereto to close the box. The end sections 76 are likewise provided with suitable openings 75 to aid in the dissipation of heat.

It will be seen in Figures 1 and 2 the bottom rail 77 of the panel frame contains pins 78 which are disposed substantially parallel to the transparent plate 62. The bottom end member 76 of the lamp box is perforated to receive the pins 78 and thereby securely hold the bottom end of the lamp box in the frame.

As will be seen in Figures 1, 2 and 4, a lip 79 extends upwardly from the top end plate 76 of the lamp box and abuts against the end rail 63 of the frame. Side rails 60 of the frame contain perforations 80 into which the tenons 81 and the bolt 82 of a retaining bar 83 are projected. Retaining bar 83 lies over the lip 79 and against the end member 63 of the frame and serves to secure the upper end of the lamp box in the frame. Bolt 82 rests in a socket formed in the end of the retaining bar 83 and is pressed outwardly of that socket by a spring 84. The bolt is provided with a suitable knob or handle 85 that projects through a slot in the side wall of the retaining bar so that the bolt may be telescoped into the retaining bar to permit removing the bar from the frame, thereby to free the lamp box.

From the foregoing it will be seen that the lamp box contains a source of light and the diffusing plate 69, this box being formed as a unit which may be attached to and removed from the panel frame as desired. The retaining plates 71 by which the translucent plate 69 is held in the lamp box bear against the translucent strips 65 and serve to hold these strips in place in the frame when the lamp box is registered therewith. The translucent strip 65 contains opaque characters and when the source of light 74 is energized the characters will stand out in silhouette against a lighted background.

While the lamp box is shown as a frustum of a pyramid it will be apparent to one skilled in the art that it may be shaped as a parabolic reflector so as to reflect the light from source 74 more uniformly upon the diffusing plate 69, thereby to insure that the panel will be uniformly lighted over its entire surface. The use of other shapes of lamp boxes is contemplated and we are not to be limited to the particular shape shown in the drawings by way of example.

The panel unit shown in Figures 1 to 5 inclusive with its self-contained source of illumination may be mounted in a suitable frame such as has been used heretofore. The arrangement is particularly advantageous in that the space in the rear of the panels need not be entirely clear and free of obstructions. As will be apparent to one skilled in the art, the presence of water pipes, electrical conduits and the like in the wall of a building oftentimes make it difficult to secure a clear space of the depth required to receive the lamp box 66. The presence of pipes and the like is not detrimental as the lamp boxes may be fitted in between pipes, if required.

Preferably the lamp box 66 is formed of metal such as sheet iron painted on the outside to guard against rusting. The inside surface of the lamp box may be left bright to aid in reflecting light or it may be painted with a suitable gloss paint capable of reflecting light thrown upon it.

From the foregoing, it will be apparent that the directory of our invention is possessed of many advantages. With the name strips composed of a translucent material and with a white frosted or opal glass plate 35 placed immediately behind these strips and with black letters and figures secured upon the name strips, a very serviceable directory is produced. Illumination is not necessary since the names upon the strips stand out clearly against a white background.

Illumination may be used, if desired, and this illumination may be either in white or colored lights as required to harmonize with the decorative scheme of the lobby in which the directory is to be used. The structure is inexpensive to manufacture and maintain and is capable of giving long service with a minimum of maintenance.

While we have illustrated our invention by showing and describing a building directory, we have done so by way of example only as it will be apparent to one skilled in the art that the teachings of the invention may be put to other uses.

Having thus complied with the statutes and shown and described a preferred embodiment of our invention what we consider new and desire to have protected by Letters Patent is pointed out in the appended claims.

What is claimed is:

1. In a directory panel, a rectangular frame comprising grooved side rails and end rails removably fixed thereto and extending therebetween, a transparent panel extending across said frame and into said grooves and being held therein by said end rails, translucent strips disposed on said panel and extending into said gooves, opaque characters fixed upon said strips, means including a source of light and a reflector for illuminating said directory panel from the rear to cause said characters to stand out in silhouette, a translucent diffusing plate fixed to said reflector and means for holding said plate against said strips.

2. In a directory panel, a frame composed of L-shaped members fitted together to form a rectangle having flanges upstanding from its outer edges, said flanges being undercut adjacent to the other legs of the members to form a groove extending around the frame, a transparent panel extending across the frame and into the grooves, translucent strips disposed on said transparent panel and in said grooves, opaque characters fixed upon said strips, a lamp box comprising a reflector shaped to fit in said frame against said strips, a translucent panel fixed in the reflector, and a source of light between said reflector and panel, and means for holding said lamp box in said frame against said strips so that light from said source will illuminate the strips and cause the characters thereon to stand out in silhouette against a softly lighted background.

3. A directory panel comprising, a rectangular frame, a transparent panel fixed therein, a plurality of translucent strips disposed on said panel and extending from side to side of said frame, opaque characters fixed upon said strips, a reflector, a translucent panel fixed in said reflector, a source of illumination in said reflector, and means for holding said reflector in said frame against said strips and with said translucent panel substantially parallel to said transparent panel.

4. In a directory panel, a rectangular frame, a transparent panel, means for holding said panel in said frame, a plurality of translucent strips disposed on said panel and extending across the frame from side to side, means on the frame for holding said strips in place, a lamp box fitted within said frame and against said strips, a source of light in said box, a translucent panel, means for holding said translucent panel between said source of light and said strips, means fixed in one end of said frame and engaging said box to hold one end of the same in said frame, and removable means at the opposite end of said frame engaging said box to hold the other end of the same in the frame.

5. In a directory panel, a rectangular frame, a transparent panel, means for holding said panel in said frame, a plurality of translucent strips disposed on said panel and extending across the frame from side to side, a lamp box fitted within said frame against said strips, a source of light in said box, a translucent panel, means for fixing said translucent panel in said box, pin means extending from said frame, there being perforations in said lamp box into which said pin means extend to hold one end of the lamp box in the frame, and a removable bar fixed in the other end of said frame and engaging the other end of the lamp box to hold the same in said frame, light from said source passing through said translucent members to render said characters visible in silhouette through said transparent panel.

6. In a directory panel, a generally rectangular frame composed of three L-shaped members, there being grooves in two of said members, a transparent panel fitted in said frame and extending into said grooves, means for closing said frame and for holding said panel therein, a plurality of translucent strips disposed on said panel and extending across the frame from side to side and into said grooves, a lamp box fitted against said frame, flange means on said lamp box bearing against said strips to hold them in place, means in said lamp box for emitting and diffusing light to illuminate said strips, and means engaging the box and frame for holding the device together as a unit.

GEORGE L. MACKINTOSH.
EARL B. BARKLEY.
WILLIAM ENGLAND.
LESTER H. WILLSON.